Patented May 12, 1953

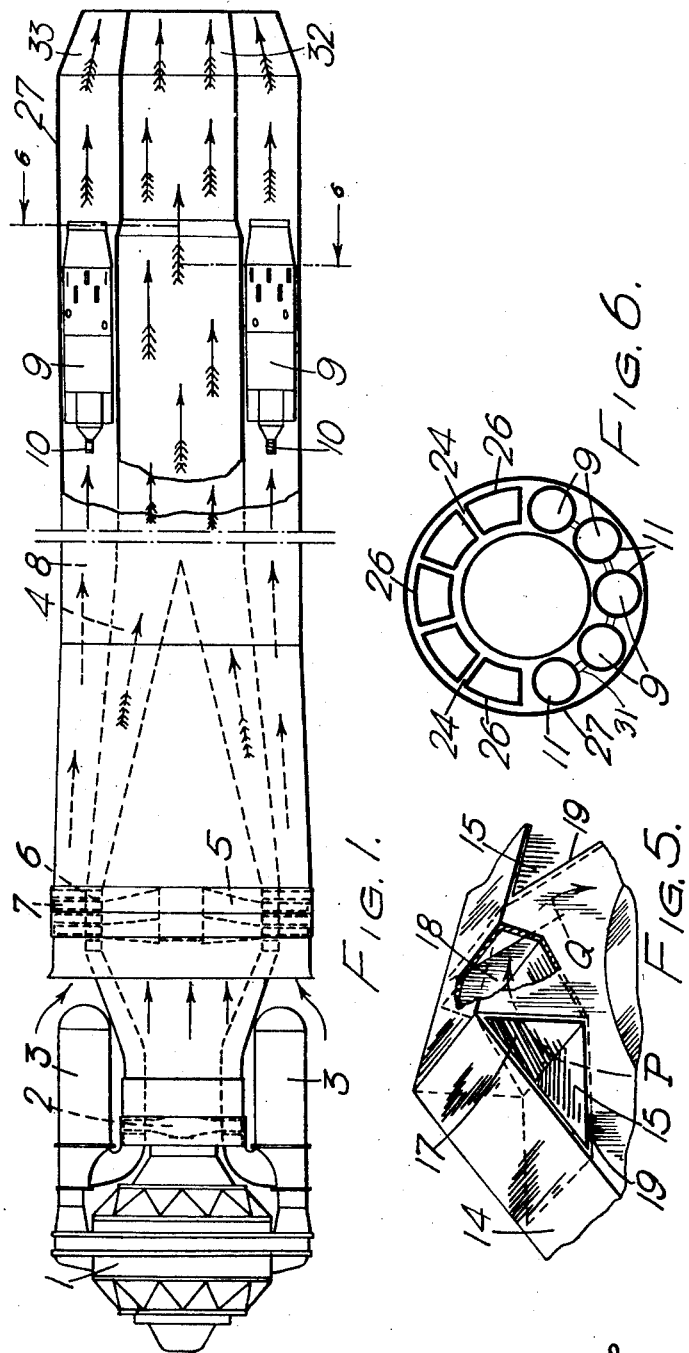

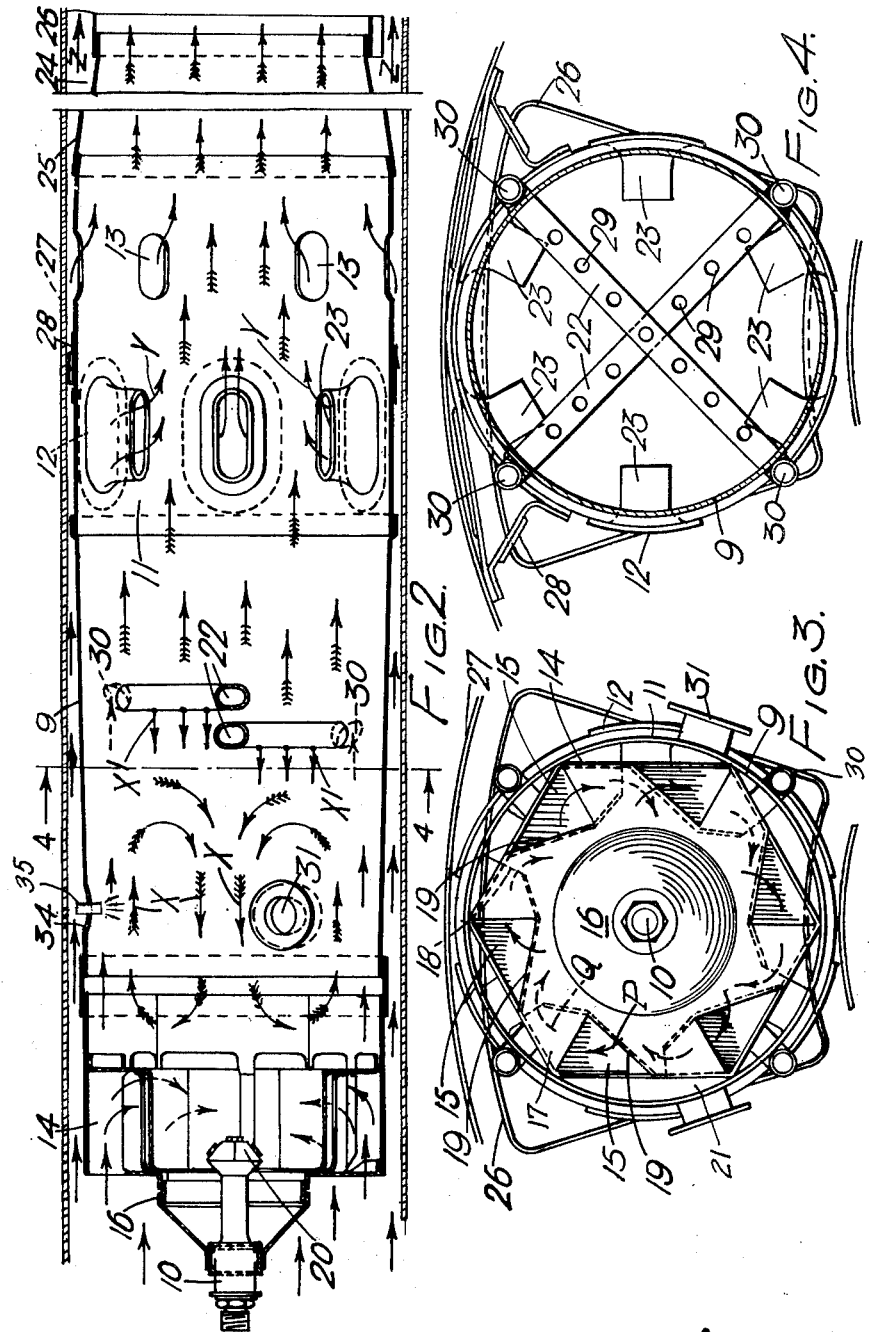

2,637,974

UNITED STATES PATENT OFFICE 2,637,974

COMBUSTION APPARATUS FOR AN AIR STREAM AND PROPULSIVE SYSTEM

Matthew Lewis Nathan, Godalming, England, assignor to Power Jets (Research & Development) Limited, London, England Application September 5, 1945, Serial No. 614,503
In Great Britain March 16, 1944

Section 1, Public Law 690, August 8, 1946
Patent expires March 16, 1964

11 Claims. (Cl. 60—35.6)

This invention relates to combustion apparatus, and especially to apparatus for the burning of liquid fuel in circumstances where combustion over a wide range of air/fuel ratio is required, and where the pressure loss due to mixing and combustion is to be kept to a minimum although the volumetric space available is restricted. Such a case (and it is primarily to meet the requirements of this case that the invention is conceived) is that in which it is required to burn liquid fuel in an air stream which has been generated for the purposes of aircraft propulsion, in a duct which forms part of a jet propulsion or ducted fan system. In a particular example to which the invention is proposed to be applied, and which is included in the invention, there is in an aircraft propulsion system, a gas turbine prime mover which by its propulsive exhaust drives an augmentor turbine which in turn drives an axial-flow compressor, the air energised by this compressor forming a thrust-augmenting stream in an annular duct surrounding the exhaust stream from the prime mover. In the augmentor stream, downstream from its compressor, fuel is to be burnt to energise this stream further. In such a scheme, it is necessary for practical utility that this secondary combustion should occur with the least possible pressure loss, whilst it will be clear that consideration has also to be given to space and weight.

Furthermore, while on the one hand, the combustion of a jet or spray of fuel in an air stream is best effected in a cylindrical combustion chamber, on the other hand a chamber which is wholly cylindrical does not make the most effective use of the space within an annular duct.

According to the invention combustion apparatus is provided for burning fuel in an annular air duct comprising a plurality of flame tubes arranged as a circular series about an axis with which their general directions are substantially parallel within a common annular duct, each of the said flame tubes comprising a partially obturated upstream end and a wall pierced for the inward passage of air, each tube being associated with a downstream outlet which is formed sectorwise.

By way of example, one form of embodiment of the invention is described hereinunder with reference to the accompanying drawings in which:

Fig. 1 is a general representation partly in longitudinal section of a system in which the invention is intended to be applied;

Fig. 2 is an enlarged view in longitudinal section of one form of embodiment of the invention;

Fig. 3 is a left hand end view of said embodiment;

Fig. 4 is a sectional view on the line 4—4 of Fig. 2;

Fig. 5 is a perspective view of a detail;

Fig. 6 is a section on the line 6—6 of Fig. 1.

Referring to the drawings, Fig. 1 shows the general arrangement of a propulsive system for aircraft to which the invention is intended to be applied. This system comprises a compressor rotor 1 driven by a gas turbine 2 mounted coaxially on the same shaft, the air drawn in by the compressor being brought to combustion together with fuel in the compressor output which is delivered to the combustion chambers 3 in which combustion takes place. The hot gases are led through the turbine 2, thus driving it, are then passed through an annular duct 4 and are finally emitted through an outlet 32 forming in this way a main propulsive jet stream.

The propulsive system further comprises an augmentor system 5 comprising a further gas turbine element 6 which in turn drives a further compressor or ducted fan 7 which entrains new or secondary air through an annular duct 8. This air passes along the duct 8 and finally emerges from the apparatus at the outlet 33 being expelled together with the main jet stream from the outlet 32 and thus augmenting the thrust produced.

Downstream from the augmentor 5 in the secondary air, secondary fuel is burned in a number of flame tubes 9 arranged in the annular duct 8 to augment the thrust by raising the velocity of discharge, fuel being injected into the flame tube 9 by means of a burner 10. The end of the duct is shown in section, to reveal the flame the flame tubes 9.

The invention is concerned with the construction and arrangement of the flame tube 9 and an enlarged view of such a flame tube in longitudinal section is shown in Fig. 2.

The flame tube consists mainly of a light sheet metal cylindrical body 11 with apertures 12, 13, distributed axially and circumferentially for the inward passage of air. The upstream end of the flame tube is slightly reduced in diameter and is provided with a conical obturator 14 which has tangentially directed air pockets 17 (Figs. 3 and 5) to receive and swirl primary air in the region of an atomising burner 10 which is fitted axially in the apex of the conical portion 16 of the obturator 14. On account of the function of the member 14, it may be referred to as a primary swirler.

The swirler 14 is more clearly shown in Figs. 3 and 5. This is hexagonal in form and comprises six pockets 17 arranged around the periphery and each provided with a triangular opening 15, the walls 19 of the pockets 17 being arranged so that air which is travelling in the direction of the arrow P in a plane perpendicular to the plane of the paper in Fig. 3 enters the opening 15 and is then deflected through approximately 90° into the plane of the paper in Fig. 3, travelling through the pocket 17 and finally emerging from said pocket through a narrow rectangular aperture 18 whereupon the air strikes the wall 19 of the immediately adjacent pocket and is then obliged to travel in the direction of the arrow Q by reason of its impact against said wall 19. By the provision of a number of such pockets 17 in the swirler 14, the air is induced to follow a rapid swirling motion as shown by the arrows in Figs. 2 and 3, the full line arrows indicating the air before it enters the pockets 17 and the chain line arrows indicating the path of the air after it has emerged from said pocket.

As above mentioned, the pockets 17 are provided for the admission of primary air and it is advantageous to make these pockets as large as possible, while air is also admitted to the flame tube 9 around the outside of the primary swirler 14 through the six sectional gaps 21 made by the junction of the hexagonal swirler 14 with the circular flame tube body 11. This assists greatly in reducing the combustion pressure loss, while the strong swirl imparted to the portion of the primary air near the axis of the flame tube 9, as shown by the feathered arrows at X in Fig. 2 creates sufficient reversal to hold the flame back on to the burner 10 at very low fuel flows. This reversal is also fed by air admitted to the central region of the flame tube through two tubes 22 which cross substantially at right angles at a suitable distance, for example about 12", downstream of the burner 10. These tubes 22 are provided with lateral apertures 29 on their upstream side and with inclined openings 30 at each end which face upstream. Additional primary air thus enters the tubes 22 and flows towards burner 10 as indicated by the arrows X1 in Fig. 2 and this additional primary air assists in obtaining stable combustion at very rich mixtures.

The two cross tubes 22 also impart rigidity to the flame tube body 11.

Secondary air is admitted to the flame tube 9 through a row of longitudinal slots 12 and a row of longitudinal slots 13. The slots 12 are associated with nozzles 23 and have been found efficient in introducing air to the central or axial region of the secondary combustion zone, as shown by the arrows Y, and the improved mixing thus obtained gives more complete combustion at rich mixtures.

The downstream end of the flame tube 9 changes its section smoothly from circular at the portion 11 to segmental at the portion 26 leaving an annular passage 24 between the end 26 of the flame tube and the duct walls 27 from which passage issues a stream of relatively cool air of even thickness in the direction of the arrows Z which stream is interposed between the hot combustion products and the duct walls 27 thus keeping the latter cool while at the same time the outlets 26 together occupy substantially the whole of the annular section of duct 8. This air constitutes tertiary air and gradually mixes with the products of combustion in the region between the end 26 of the flame tubes 9 and the final ejection nozzle 33 at the same time keeping the duct wall 27 upstream of said nozzle reasonably cool. Each flame tube 9 may have an electric spark igniter plug 35 extending into it through the opening at 34 or only one or some selected ones of the series is provided with such means, in the latter case all flame tubes being interconnected by lateral pipes through a union 31 to enable one flame tube to light up from its neighbor.

The burner 10 injects fuel into the flame tube 9 through a nozzle 20 which may produce a single jet or a plurality of fuel jets.

The dimensions of the flame tube 9 are different from the hitherto known tubes in that while maintaining the same length, the width of the flame tubes is considerably increased to pass a greater quantity of gases and to permit higher fuel flows.

The flame tube 9 is secured to the duct 27 by means of supports 28 and the dimensions and locations of the various apertures are such as to admit primary, secondary and tertiary air in the desired quantities and proportions.

The flow of cold air and hot gases through the flame tube 9 is indicated by arrows, the feathered arrows indicating hot gases and the non-feathered arrows indicating cooler air.

It is convenient to arrange for a series of for example ten, flame tubes to extend completely around the circumference of the duct 8 as shown in Fig. 6. Each flame tube 9 may itself be provided with a segmental casing and ten such segmental casings may then be arranged to occupy the complete circumference of the duct 8.

I claim:

1. Combustion apparatus for burning fuel in an air-stream comprising a combustion chamber in the form of an annular duct for said stream, and a plurality of flame tubes arranged as a circular series within said duct with their lengths substantially parallel to the axis of the duct, said flame tubes being made up of partially obturated upstream ends apertured to admit primary air, perforated parts of circular cross-section extending from said ends, of such diameter that together they occupy almost the full width and full mean circumference of said duct and downstream outlet ends discharging into said annular duct, said outlet ends being of sector-shaped section into which said circular parts smoothly merge, all the sector-shaped outlets together occupying substantially a complete annular section of said duct.

2. Combustion apparatus for burning fuel in an air-stream, comprising a combustion chamber in the form of an annular duct for said stream, and a plurality of flame tubes arranged as a circular series within said duct with their lengths substantially parallel to the axis of the duct, said flame tubes being made up of partially obturated upstream end walls apertured to admit primary air, perforated cylindrical walls extending from said end walls to form upstream parts of circular cross-section, downstream extensions of said walls forming outlet ends of sector-shaped section into which said circular parts smoothly merge, and at least two non-parallel inlet tubes extending through the said cylindrical wall of each said flame tube for admitting additional primary air to the interior of the flame tube, said circular upstream parts being of such diameter that together they occupy almost the full width and mean circumference of said duct while said sector-shaped outlets, which discharge into said duct, together occupy substantially a complete annular section of the duct.

3. Combustion apparatus according to claim 2 wherein said inlet tubes, which are two in number, are arranged substantially at right angles to one another within each flame tube and provided with a plurality of lateral apertures on their upstream side.

4. Combustion apparatus according to claim 2 wherein said inlet tubes, which are two in number, are arranged substantially at right angles to one another within each flame tube and provided at each end with openings passing upstream for the admission of primary air and with a plurality of lateral apertures on their upstream side.

5. Combustion apparatus according to claim 2 wherein said inlet tubes, which are two in number, are arranged substantially at right angles to one another and provided with a plurality of external apertures facing upstream and at each end with openings facing upstream for the admission of primary air, each flame tube further comprising means for admitting secondary air downstream of said inlet tubes.

6. Combustion apparatus according to claim 2 wherein said inlet tubes, which are two in number, are arranged substantially at right angles to one another and provided with a plurality of lateral apertures facing upstream and at each end with openings facing upstream for the admission of primary air, each flame tube further comprising means for admitting secondary air downstream of said inlet tubes, at least some of said means being adapted to direct the air within the flame tube.

7. Combustion apparatus according to claim 2 wherein said inlet tubes, which are two in number are arranged substantially at right angles to one another and provided with a plurality of lateral apertures facing upstream and at each end with openings facing upstream for the admission of primary air, each flame tube further comprising means for admitting secondary air downstream of said inlet tubes and means for admitting tertiary air into the space between the external wall of each flame tube and the internal wall of said duct, at least some of the means for admitting secondary air being adapted to direct the air within the flame tube.

8. Combustion apparatus according to claim 2 including inter-connecting tubes extending laterally between said flame tubes and wherein said inlet tubes, which are two in number, are arranged substantially at right angles to one another and provided with a plurality of lateral apertures facing upstream and at each end with openings facing upstream for the admission of primary air, each flame tube further comprising means for admitting secondary air downstream of said inlet tubes and means for admitting tertiary air into the space between the external wall of each flame tube and the internal wall of said duct, at least some of the means for admitting secondary air being adapted to direct the air within the flame tube.

9. Combustion apparatus for burning fuel in an air-stream, comprising a combustion chamber in the form of an annular duct for said stream, a plurality of flame tubes arranged as a circular series within said duct with their lengths substantially parallel to the axis of the duct, said flame tubes being made up of partially obturated upstream end walls apertured to admit primary air, walls extending from said end walls to form firstly upstream parts of circular cross-section occupying together almost the full width and mean circumference of said duct and secondly downstream outlet ends of sector-shaped section into which said circular upstream parts smoothly merge, the sector-shaped outlets, which discharge into the duct, together occupying substantially a complete annular section of the duct, an electric igniter in at least one of said flame tubes, a plurality of inter-connecting tubes extending laterally between said flame tubes so that the interior of every flame tube without an igniter is connected to the interior of at least one flame tube provided with an igniter as aforesaid, and, for admitting additional primary air to each flame tube, two inlet tubes extending through the wall of said circular upstream part of each of said flame tubes substantially at right angles to each other, each said inlet tube being provided with a plurality of lateral apertures facing upstream inside the flame tube and at each end with openings facing upstream for the admission of primary air, each flame tube further comprising means for admitting secondary air downstream of said tubes and means for admitting tertiary air into the space between the external wall of each flame tube and the internal wall of said duct, at least some of the means for admitting secondary air being adapted to direct the air within the flame tube.

10. A propulsive system comprising a first air compressor, means for burning fuel in the output air from said compressor, a first turbine driving said compressor and driven by the gases of combustion, an axial flow compressor, an augmentor turbine driven by at least part of the exhaust gases from said first turbine and itself driving said axial flow compressor, a duct for the passage of the exhaust stream from said augmentor turbine, and having a reaction propulsion nozzle, an annular duct surrounding said exhaust stream for the passage of a stream from the axial flow compressor and having a second reaction propulsion nozzle, and in said annular duct combustion apparatus comprising a plurality of flame tubes arranged as a circular series within said duct about an axis with which their general directions are substantially parallel, each of said tubes being associated with a sector-shaped downstream outlet and having a partially obturated upstream end, a swirler for the admission of primary air towards said end, and a wall pierced for the inward passage of gases, each swirler defining by its outer boundary surface in combination with the adjacent internal surface of the flame tube within which said swirler is arranged a plurality of separate openings located between said surface and comprising a plurality of tangentially directed pockets mutually co-operating to deflect the air passing therethrough and to produce a turbulent motion on the air issuing therefrom.

11. Propulsive system comprising a first air compressor, means for burning fuel in the output air from said compressor, a first turbine driving said compressor and driven by the gases of combustion, an axial flow compressor, an augmentor turbine driven by at least part of the exhaust gases from said first turbine and itself driving said axial flow compressor, a duct for the passage of the exhaust stream from said augmentor turbine and having a reaction propulsion nozzle, an annular duct surrounding said exhaust stream for the passage of a stream from the axial flow compressor and having a second reaction propulsion nozzle, and in said annular duct combustion apparatus comprising a plurality of flame tubes arranged as a circular series within said duct about an axis with which their general directions are substantially parallel, each of said tubes being associated with a sector shaped downstream outlet, and all the outlets together occupying substantially a complete annular section of said duct.

MATTHEW LEWIS NATHAN.

References Cited in the file of this patent

UNITED STATES PATENTS

| Number | Name | Date |
|---|---|---|
| Re. 23,149 | Lubbock et al. | Sept. 30, 1949 |
| 938,182 | Todd et al. | Oct. 26, 1909 |
| 2,000,733 | Avery | Mar. 7, 1935 |
| 2,222,031 | Hammer | Nov. 19, 1940 |
| 2,398,654 | Lubbock | Apr. 16, 1946 |
| 2,402,377 | Davenport | June 18, 1946 |
| 2,404,334 | Whittle | July 16, 1946 |
| 2,404,335 | Whittle | July 16, 1946 |
| 2,405,723 | Way | Aug. 13, 1946 |
| 2,405,919 | Whittle | Aug. 13, 1946 |
| 2,432,359 | Streid | Dec. 9, 1947 |
| 2,445,114 | Halford | July 13, 1948 |
| 2,595,999 | Way et al. | May 6, 1952 |